Figure 1:
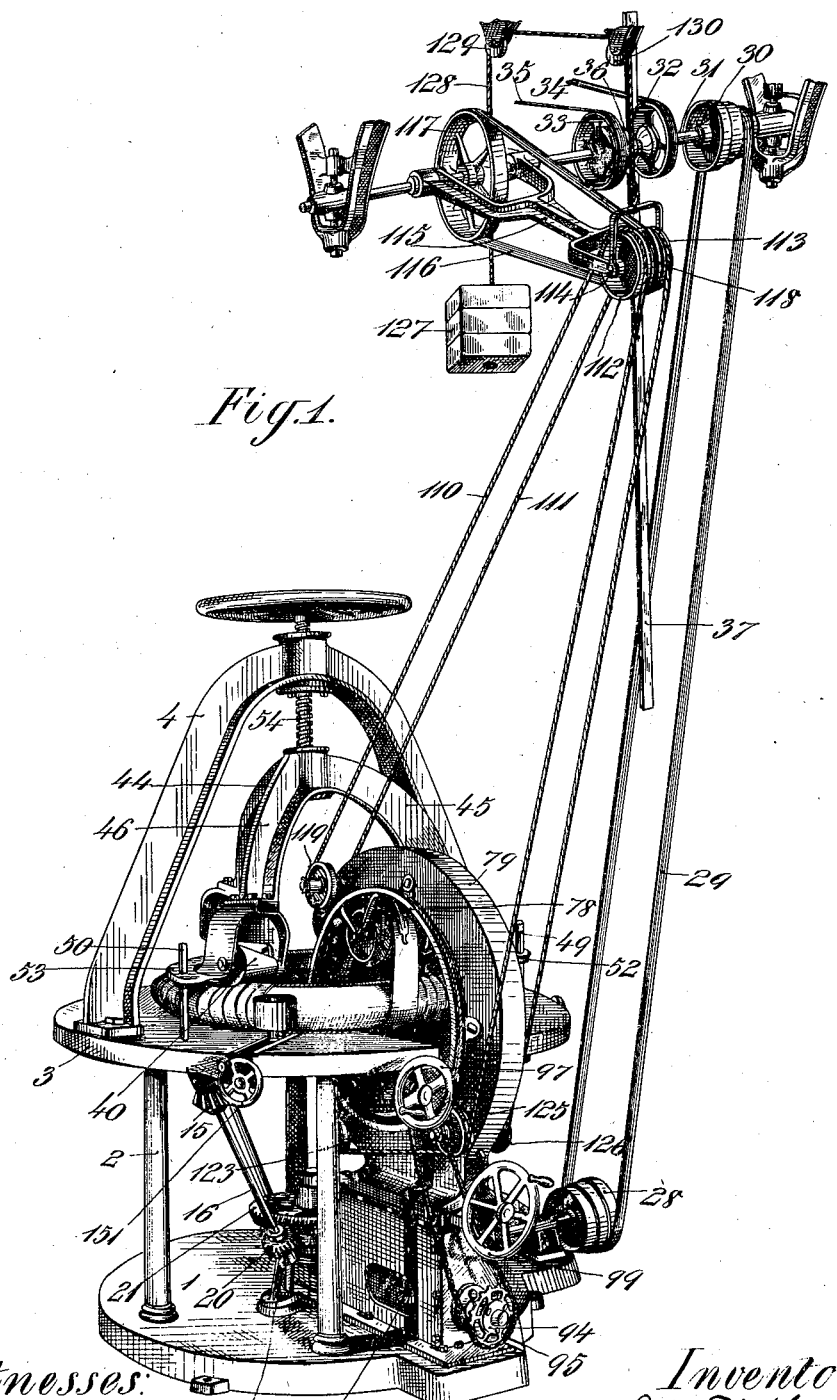

A. DE LASKI & P. D. THROPP.
TIRE WRAPPING MACHINE.
APPLICATION FILED SEPT. 10, 1909.

1,011,450.

Patented Dec. 12, 1911.
5 SHEETS—SHEET 1.

Witnesses:
M. Greenberg
F. George Barry.

Inventors:
Albert de Laski
Peter D. Thropp
By Brown Deward
their Attorneys

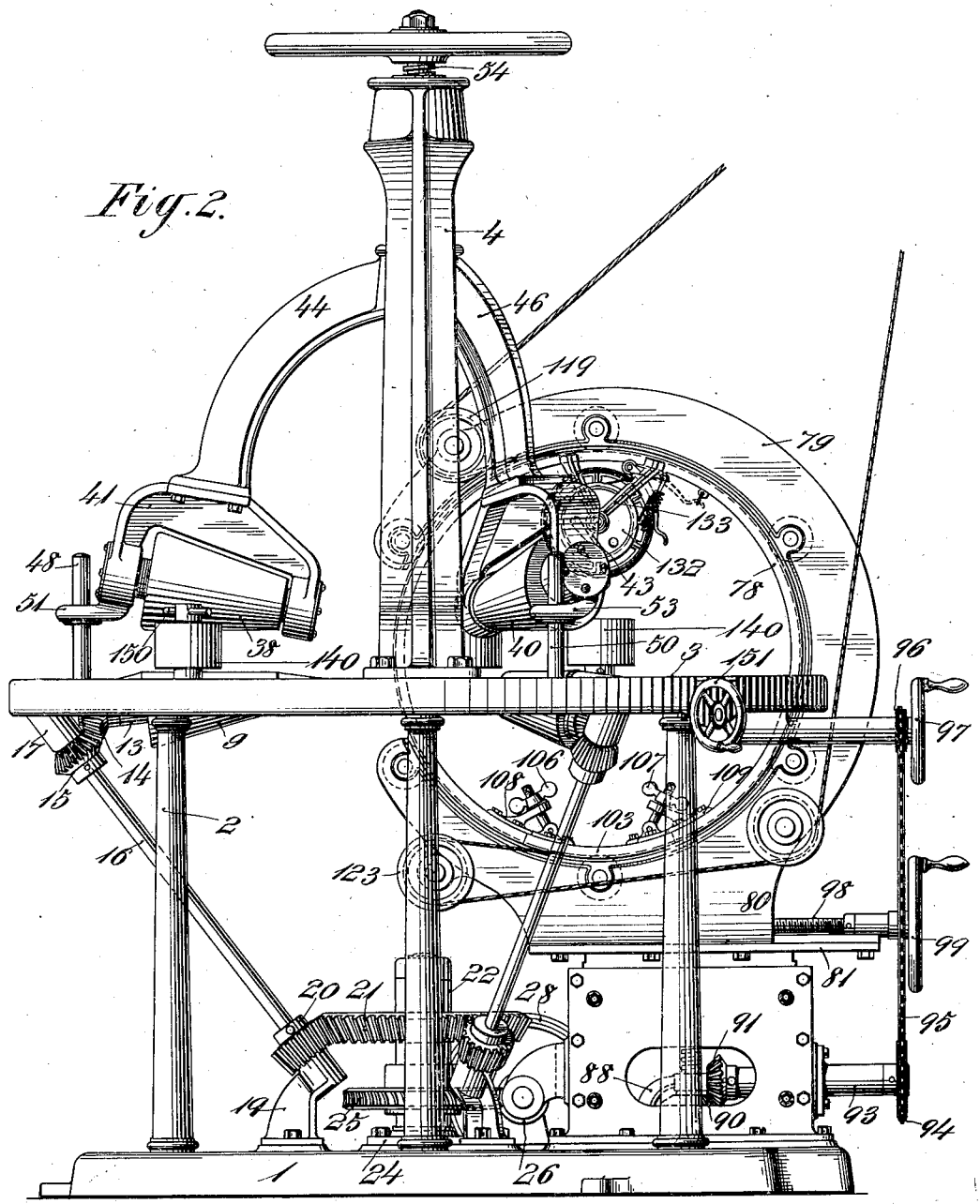

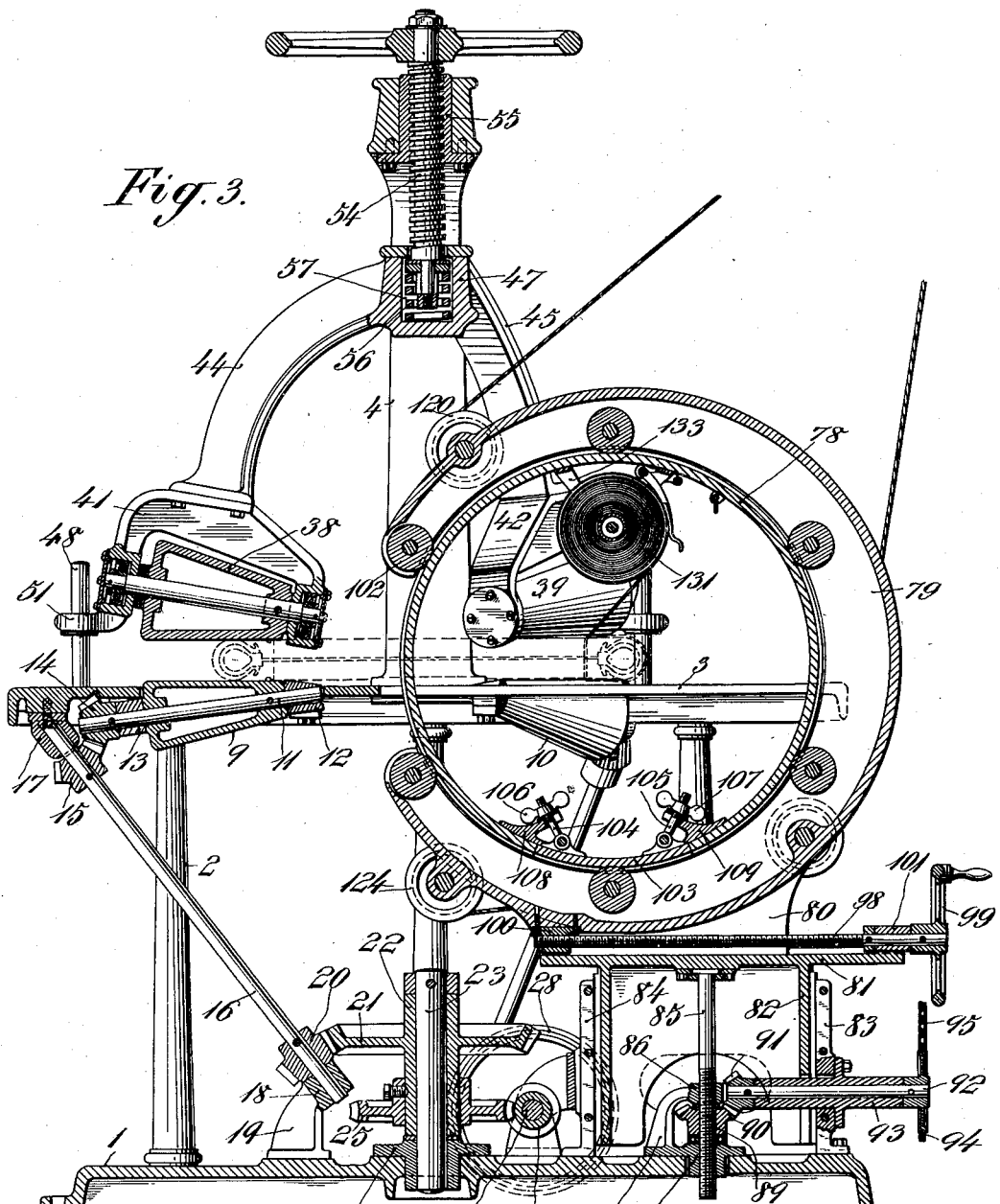

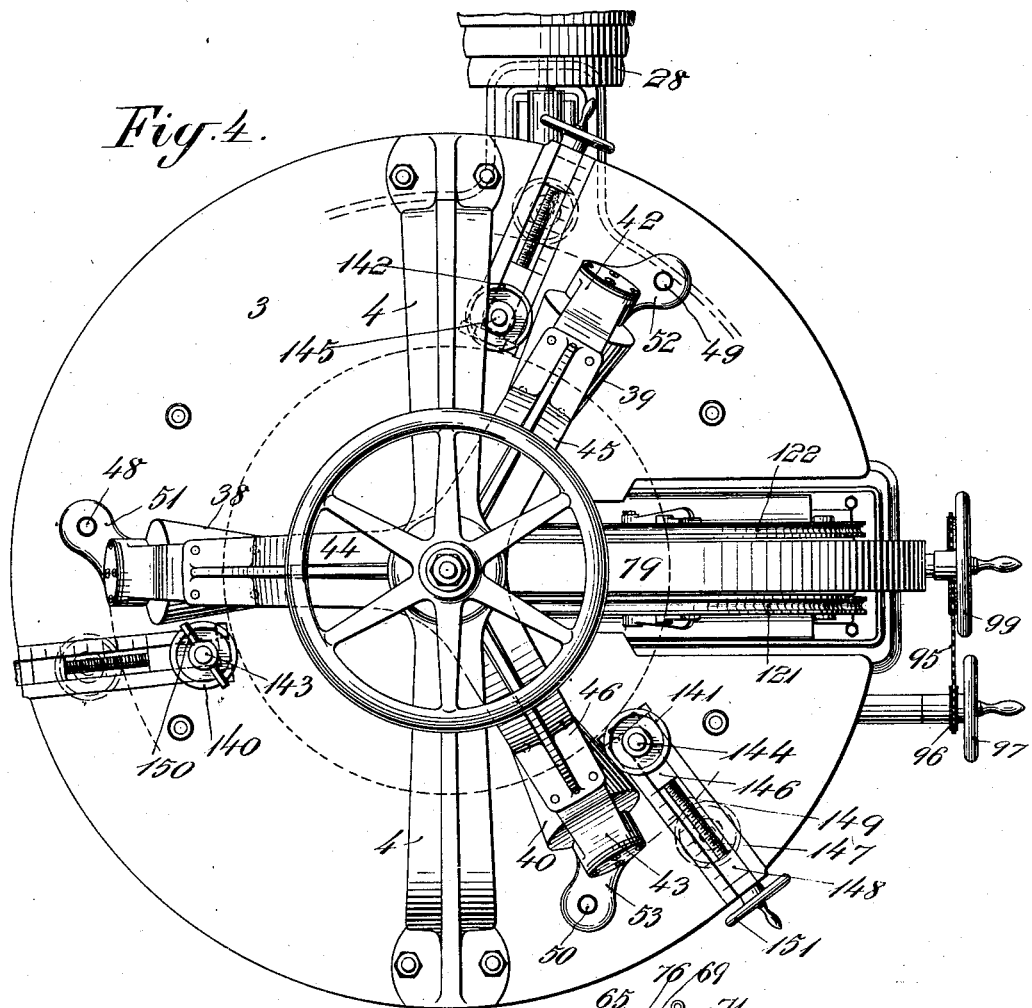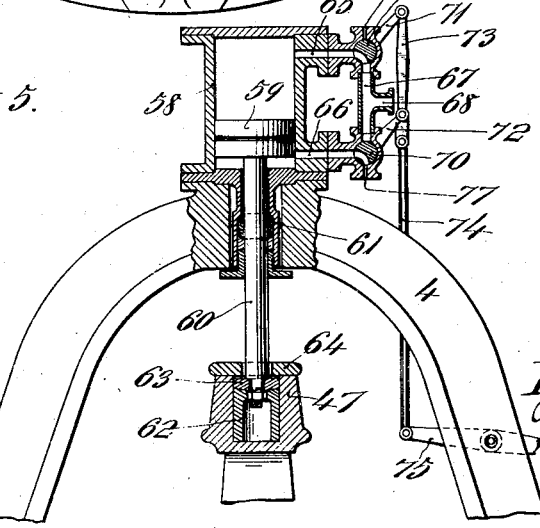

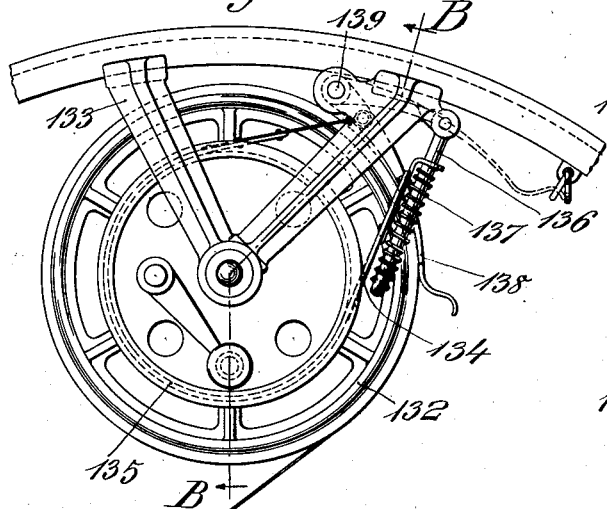
Fig. 6.
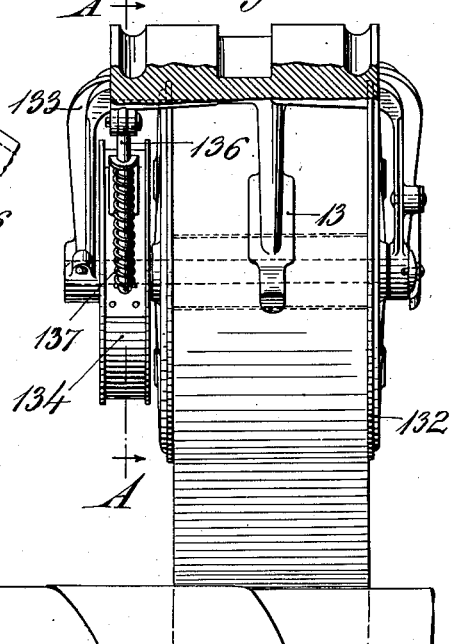
Fig. 7.
Fig. 8.
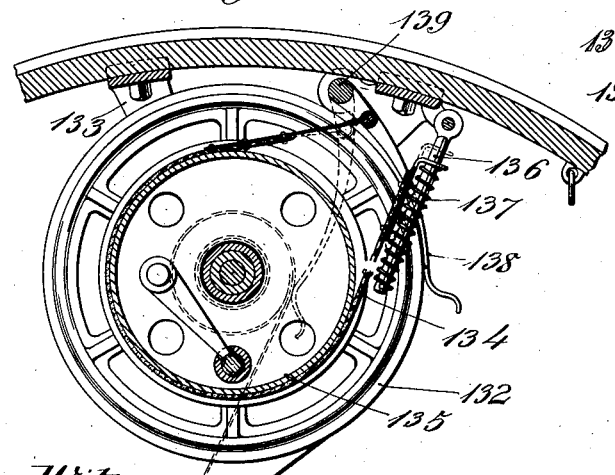
Fig. 9.
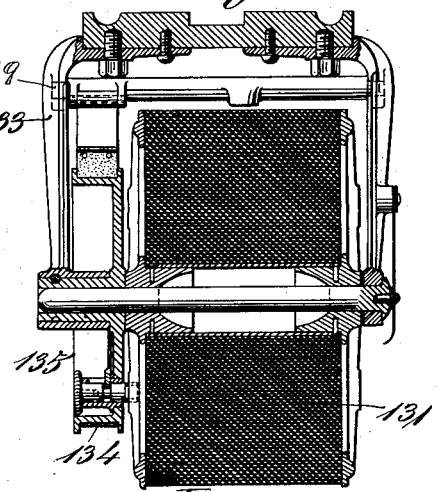

UNITED STATES PATENT OFFICE.

ALBERT DE LASKI, OF WEEHAWKEN, AND PETER D. THROPP, OF TRENTON, NEW JERSEY, ASSIGNORS TO THE DE LASKI AND THROPP CIRCULAR WOVEN TIRE COMPANY, OF TRENTON, NEW JERSEY, A CORPORATION OF NEW JERSEY.

TIRE-WRAPPING MACHINE.

1,011,450.  Specification of Letters Patent.  Patented Dec. 12, 1911.

Application filed September 10, 1909. Serial No. 517,138.

*To all whom it may concern:*

Be it known that we, ALBERT DE LASKI and PETER D. THROPP, citizens of the United States, and residents, respectively, of Weehawken, in the county of Hudson and State of New Jersey, and of Trenton, in the county of Mercer and State of New Jersey, have invented a new and useful Tire-Wrapping Machine, of which the following is a specification.

Our invention relates to a tire wrapping machine with the object in view of providing a machine which will rapidly wrap a tire under even tension.

In the manufacture of tires by what has come to be known as the open cure process, to wit; where more or less of the thread portion of the tire is not covered by the mold and left exposed to the action of steam, it is desirable that the tire, after it is made up on the core and the side pressure rings which form the clencher are in position, be wrapped by a strip of fabric of such a character and of such thickness that the steam will penetrate through this canvas into contact with the rubber throughout that portion of the tire left exposed by the mold during the vulcanizing process.

Our present invention is directed to a machine for performing this wrapping work and while we have referred to it as a tire wrapping machine it is to be understood that it is equally applicable in wrapping annular bodies other than tires, if so desired.

A practical embodiment of our invention is represented in the accompanying drawings, in which—

Figure 1 is a view of the wrapping machine in perspective, Fig. 2 is a view on an enlarged scale in side elevation, Fig. 3 is a vertical central section, Fig. 4 is a top plan view, Fig. 5 is a vertical section through the fluid pressure mechanism for exerting pressure upon the side of the tire and its side ring to hold the parts in position during the wrapping operation, Fig. 6 is an enlarged view in detail in side elevation of the bobbin spool and means for exerting tension on the bobbin showing the wrapping bandage leading to the tire and its side rings, the tire and its rings being shown in cross section, Fig. 7 is a view of the same in a plane at right angles to the plane in which Fig. 6 is taken, Fig. 8 is a section in the plane of the line A—A of Fig. 7, and Fig. 9 is a section in the plane of the line D—D of Fig. 6.

The frame of the machine consists conveniently of a base 1 from which uprise pillars 2 supporting a table 3, here shown of circular form, and from opposite sides of the table 3 an upwardly extending arch frame 4 is secured to form a support for the mechanism which is to exert pressure upon the assembled tire and side rings during the wrapping operation.

The assembled tire, core and side rings, clearly shown in Fig. 6 where the tire is denoted by 5, the core by 6 and the side rings by 7 and 8, is laid in the position shown in full lines, Fig. 1, and in dotted lines, Fig. 3, in a horizontal position on the table 3 or rather upon certain cone shaped rollers 3, any number, two being shown in Fig. 3 and denoted respectively by 9 and 10, the upper faces of which project slightly above the upper surface of the table 3 and lie in a plane substantially parallel thereto. These rollers are quite similar in their construction and in the manner in which they are driven so that a description of the mounting and driving mechanism for one will suffice for all. Take for instance, the roller 9, (see Fig. 3). It is made fast to a spindle 11, the inner end of the spindle being mounted in a bearing 12 fixed to the table and the outer end in a bearing 13 also fixed to the table. The outer end of the spindle 11 has a bevel gear pinion 14 fixed thereon which intermeshes with a bevel gear pinion 15 fixed on a diagonal shaft 16, the upper end of which is mounted in a bearing 17 fixed to the table 3 and the lower end in a bearing 18 fixed to a bracket 19 uprising from the base 1. Near its lower end the diagonal shaft 16 is provided with a bevel gear pinion 20 fixed thereon which meshes with a master bevel gear wheel 21 carried by a sleeve 22. The sleeve 22 is loosely mounted on a stub shaft 23 fixed in a step 24 set in the base 1 and said sleeve 22 has fixed thereon, below the master wheel 21, a worm wheel 25 which engages a worm 26 on a shaft 27 mounted in suitable bearings on the base 1 and provided on its outer end with a pulley 28 by means of which the shaft 27 is driven through a belt 29 leading to a pulley 30 on a drive shaft 31, (see Fig. 1). The drive shaft 31 is actuated by a suitable source of power, and is here shown as provided with two drive pulleys, one denoted by 32 and the other by 33, the pulley 31 being connected by a belt 34 with a source of power, not shown, and the other, 33, connected by a cross belt 35 with the same source of power.

A clutch 36 of any well known or approved form, located between the pulleys 32 and 33, and operated by a handle 37, is caused to rotate with the shaft 31 and by throwing the said clutch into engagement with either the pulley 32 or the pulley 33 the shaft 31 may be driven in the one direction or the opposite direction, as may be desired.

The pulleys 9, 10, etc., on which the assembled tire, core and side rings rest, are simultaneously driven in the same direction by the means hereinabove explained and cause the assembled tire, core and side rings to travel in an annular path around the fixed center. During this traveling movement, the tire and its parts are pressed against the driven pulleys 9, 10, etc., by means of cone shaped idle pulleys, here shown as three in number, denoted, respectively, by 38, 39, and 40, the rollers 38 and 39 being located directly over the driven rollers 9 and 10 and the roller 40 being located directly over the third driven roller, not shown.

The rollers 38, 39 and 40, are mounted, respectively, in yoke shaped brackets 41, 42, 43, carried by the ends of curved arms 44, 45 and 46, extending outwardly and downwardly from a head 47, at which point pressure is applied and distributed by the three arms to the respective rollers at the lower ends of the arms.

The rollers 38 to 40 inclusive, are held against a laterally vibratory motion or lateral displacement by means of guide pins 48, 49, 50, set in the table 3 and embraced respectively by bracket arms 51, 52, 53, the said arms being attached to the yoke brackets 41, 42, 43, in which the pressure rollers are mounted.

In order that the pressure rollers may roll with the least possible drag, or friction, while exerting their pressure, we find it convenient to mount them by means of ball bearings of any well known or approved form.

Pressure is exerted upon the head 47 either by means of a screw, as shown in Figs. 1 to 4 inclusive, or, as preferred, by a fluid pressure mechanism shown in Fig. 5. When exerted by means of a screw, as, for instance, by the screw 54, the said screw is mounted in an interiorly screw threaded bushing 55 secured in an opening in the top of the yoke 4 and exerts pressure on the head 47 through a heavy coil spring 56 seated in a socket 57 in the head 47. When this pressure is exerted by a fluid, as, for example, by compressed air or steam, the top of the yoke 4 is surmounted by a cylinder 58 in which reciprocates a piston 59, the stem 60 of the piston extending downwardly through a suitable stuffing box 61 in the opening in the top of the yoke 4 and thence into engagement with a cup bearing piece 62 seated in the socket in the head 47, a washer 63 being interposed between the bearing piece 62 and the cover 64 at the mouth of the socket.

Fluid is admitted to the interior of the cylinder 39 and allowed to escape therefrom through ports 65 and 66, which communicate with an inlet chamber 67 provided with an inlet opening 68, the rotary valve 69 being utilized to open and close communication between the chamber 67 and port 65 and the rotary valve 70 being utilized to open and close communication between the chamber 67 and the port 66.

The valves 69 and 70 are each provided with a tail piece, these tail pieces being denoted, respectively, by 71 and 72. These pieces are connected by a link 73 and are simultaneously operated by means of a valve operating rod 74 connected with a rocking lever 75 fulcrumed on the yoke 4.

In the position shown in Fig. 5, fluid pressure is being admitted to the cylinder 58 above the piston 59 and pressure is being exerted upon the head 47 and hence upon the several pressure rollers to hold the tire and its parts assembled therewith firmly against the driven rollers on which it rests.

When it is desired to remove the pressure and lift the pressure rollers to remove the wrapped tire, the valve rod 74 will be moved downwardly by means of the lever 75 and this movement will close the valve 69 and open the valve 70 thereby admitting the pressure fluid underneath the piston 59 and at the same time opening the space above the piston 59 through the port 65 to exhaust opening 76.

When it is desired to exert pressure on the assembled tire, core and side rings, placed in position, the valve rod 74 is raised thereby opening communication between the interior of the cylinder 58 and the external air through the port 66 and exhaust port 77, as shown in Fig. 5, and, at the same time, closing the exhaust 76 and opening communication between the chamber 67 and the interior of the cylinder 58 above the piston 59.

The amount of pressure to be exerted can be determined to the finest degree of exactness by the admission of more or less of the compressed fluid.

The screw and the fluid pressure mechanism are, however, made interchangeable so that the screw may be employed where it is not convenient to use the fluid pressure.

It will be observed that all that is required to change from the fluid pressure to the screw is to remove the cylinder, stuffing box, piston, and parts connected therewith, from the structure shown in Fig. 5 and introduce the interiorly threaded bushing 55 into the opening in the top of the yoke 4 and the spring 57 into the socket in the head 47.

The shuttle, or the parts which we are pleased to term the shuttle, consists of an annular ring 78 and is mounted in the interior of a mutilated circular race-way 79, the latter being supported upon a pedestal 80 which has a dove-tailed connection with a plate 81 fixed to or formed integral with the top of a hollow stem 82 which has a vertically reciprocating sliding movement in bearings 83, 84, fixed to the top of the base 1. A lifting screw 85 has its head engaged with the under side of the plate 81 to prevent the screw from turning and its screw threaded portion held in position by bearings 86 and 87 in a bracket 88 fixed to the base 1 is engaged by a nut 89 provided with bevel gear 90 which in turn are engaged by a bevel gear pinion 91 on the end of a shaft 92 carried in a horizontal bearing 93. For convenience in operating the shaft 92 and hence the nut 89 to raise and lower the screw 85 and with it the race-way 79 and parts carried thereby, the shaft 92 is provided with a sprocket wheel 94 connected by a sprocket chain 95 with a sprocket wheel 96 mounted up within convenient reach of the operator and operated by a hand wheel 97 (see Fig. 2).

To move the race-way 79 horizontally outwardly and inwardly and with it the parts carried thereby, there is provided a screw 98 operated by a hand wheel 99 having a screw threaded engagement with a bearing 100 fast to the race-way 79, the screw 98 having a swiveled connection with the plate 81 at 101.

The foregoing two adjustments, one vertical and the other horizontal, are for the purpose of locating the shuttle 79 with its center at the center of the tire core when the tire and its parts are assembled and laid in position on the driven rollers 9, 10, etc., for wrapping. This adapts the machine to the wrapping of tires of various diameters and various circumferences.

The shuttle 78 is allowed a rotary motion within the race-way 79 and is supported for this purpose on a series of idle rolls here shown as six in number and quite similar to one another and denoted by 102. These rollers are mounted in the race-way 79 with their faces exposed sufficiently beyond the inner face of the race-way 79 to hold the annular ring shuttle 78 away from the inner wall of the race-way and permit it a free rotary movement.

To permit the tire and the parts assembled with it to be introduced into a position to be wrapped, the shuttle 78 is provided with a gate 103 in its annular wall, which gate is conveniently held closed by means of swinging bolts 104, 105, provided with wing nuts 106, 107, the bolts being hinged to the inner face of the gate near its ends and adapted to swing into the slots in the ends of brackets 108, 109, fixed to the inner wall of the shuttle. The race-way 79 is also provided with a permanent opening through its wall, opposite which opening the gate 103 may be placed when the gate is opened to permit the tire to be placed in the position shown in dotted lines, Fig. 3.

The shuttle 78 is rotated by means of a pair of bands denoted by 110, 111, (see Fig. 1) which bands lead from pulleys 112, 113, (see Fig. 1) mounted on a jack shaft 114 carried in the bifurcated end of a frame 115 loosely fulcrumed on the shaft 31 and driven by a belt 116 from a pulley 117 fixed on the shaft 31 and passing around a pulley 118 on the jack shaft 114. From the pulleys 112, 113, the bands 110, 111, extend downwardly and around guide pulleys 119, 120, located near one end of the race-way 79, thence along grooves 121, 122, at the opposite edges of the ring-like shuttle and finally around guide pulleys 123, 124, near the opposite end of the race-way 79 back and around guide pulleys 125, 126, at the back of the race-way 79 and hence up to the pulleys 112, 113. Constant tension is exerted upon the bands 110, 111, to make them frictionally grip the grooves 121, 122, to rotate the shuttle by means of a weight 127 connected by a cord 128 which passes over guide pulleys 129, 130, with the free end of the frame 115.

The bobbin, made up of the strip of cloth with which the tire is to be wrapped, is denoted by 131. The spool on which the bobbin is wound is denoted by 132 and is mounted in a bracket 133 extending inwardly from the interior wall of the ring-like shuttle. Tension is applied to this bobbin 131 to cause it to wind with the same tension as the bobbin gradually grows smaller as follows:—A brake band 134 surrounds a brake wheel 135 on the end of the spool and at one end surrounds a swinging pin 136 and has interposed between its end and the free end of the pin a coil spring 137. The opposite end of the band 134 is connected with an arm 138 fulcrumed at 139 to the spool bracket 133 and its free end extended over the body of the bobbin so that as the bobbin becomes reduced in size and hence the leverage exerted on its circumference by the strip of cloth passing around the tire becomes lessened, the brake band 134 will gradually be loosened thereby keeping up an even tension throughout the unwinding of the bobbin.

The body to be wrapped is maintained in its position on the driven rollers 9, etc., by guide rollers here shown as three in number denoted by 140, 141 and 142, loosely mounted on vertical spindles denoted, respectively, by 143, 144 and 145 (see Fig. 4). These spindles are set vertically in blocks mounted to slide radially beneath the table 3. The sliding blocks are quite similar in form and arrangement, the one in which the spindle 144 is set being denoted by 146. An adjusting screw 147 is swiveled in a bearing 148 and has a screw threaded engagement with the block 146 to slide the block 146 outwardly and inwardly and with it the spindle 144 and guide roller 141, the spindle being allowed to travel along a radial slot 149 in the table. The outermost positions of the guide rollers are denoted by dotted lines.

For convenience in inserting and removing tires, one of the spindles, for example the spindle 143, is made removable so that it may be lifted out of its supporting block together with its roller 140, the spindle being conveniently provided with a handle 150 for that purpose. For a like purpose one of the guide pins, for example the guide pin 48, may be made to lift out of its socket.

The adjusting screw 147 is conveniently operated by a crank wheel 151, and in like manner the other adjusting screws corresponding to the screw 147 may be operated by crank wheels.

In operation, the tire, its core and its side rings having been assembled and placed in position on the rollers 9, 10, etc. and the proper pressure having been exerted on the pressure rollers to hold them in position, the strip of cloth from the bobbin is made fast to the tire and its assembled parts and the machine started. The rotary movement of the ring-like shuttle 78 will carry the cloth around the tire and its assembled parts while the advance movement of the tire and its assembled parts in an annular path driven by the rollers 9, 10, etc., will cause the strip of cloth to be laid in a spiral path around the tire and its assembled parts. As soon as the tire has been covered with one or more layers of this cloth as may be desired, the machine is stopped, the wrapped tire removed by opening the gate 103 after placing the gate in the opening in the raceway and another tire with its assembled parts is introduced for wrapping.

Whenever a change is made in the diameter of the tire or in the circumference of the tire to be wrapped, the race-way and shuttle carried thereby is adjusted horizontally and vertically to bring the center of the shuttle to correspond with the center of the tire and the wrapping is proceeded with as above described.

It is obvious that changes might be resorted to in the form and arrangement of the several parts without departing from the spirit and scope of our invention; hence we do not wish to limit ourselves strictly to the structure herein shown and described, but

What we claim is:—

1. A wrapping machine including rollers arranged in a horizontal annular path for supporting an annular body to be wrapped, means for moving the body to be wrapped in an annular course, means for exerting vertical pressure on the body during its movement, and means for applying a wrapper to the body as it moves along its annular course.

2. A wrapping machine including a set of rollers arranged in a horizontal annular path for supporting an annular body to be wrapped, a second set of rollers arranged in a horizontal annular path above the first set, the rollers in one set being driven for moving the body in an annular course and the rollers of the other set being adapted to prevent the body from vertical dislodgment, and means for applying a wrapper to the body as it moves along its annular course.

3. A wrapping machine including a set of rollers arranged in a horizontal annular path for supporting an annular body to be wrapped, a second set of rollers arranged in a horizontal annular path above the first set, the rollers of one set being driven for moving the body in an annular course and the rollers of the other set being adapted to prevent the body from vertical dislodgment, and a third set of rollers adapted to prevent the body from horizontal dislodgment, and means for applying a wrapper to the body as it moves along its annular course.

4. A wrapping machine including a set of rollers arranged in a horizontal annular path for supporting an annular body to be wrapped, a second set of rollers arranged in a horizontal annular path above the first set, the rollers of one set being driven for moving the body in an annular course and the rollers of the other set being adapted to prevent the body from vertical dislodgment, a third set of rollers adapted to prevent the body from horizontal dislodgment, the rollers of the first two sets above mentioned having their operative faces substantially horizontal and the rollers of the third set having their operative faces substantially vertical, and means for applying a wrapper to the body as it moves along its annular course.

5. A wrapping machine including a set of rollers arranged in a horizontal annular path for supporting an annular body to be wrapped, a second set of rollers arranged in a horizontal annular path above the first set, the rollers of one set being driven for moving the body in an annular course and the rollers of the other set being adapted to prevent the body from vertical dislodgment, a third set of rollers adapted to prevent the body from horizontal dislodgment, one of the rollers of said third set being removable for permitting the ready insertion and removal of the body to be wrapped, and means for applying a wrapper to the body as it moves along its annular course.

6. A wrapping machine including an annular shuttle, a race-way in which the shuttle is mounted to rotate, driven straight-sided cone-shaped rollers arranged in an annular path for supporting and moving an annular body along within the shuttle, straight-sided cone-shaped pressure rollers arranged opposite the said driven rollers and means independent of the driven rollers for exerting equal pressure upon the pressure rolls.

7. A wrapping machine including a rotary shuttle, a race-way within which the shuttle is mounted, driven rollers for moving an annular body along within the shuttle, pressure rollers supported from a common head, and means independent of the driven rollers for exerting the desired pressure on the said head.

8. A wrapping machine including a rotary shuttle, a race-way within which the shuttle is mounted, means for supporting and moving an annular body along within the shuttle, pressure rollers mounted in supports emanating from a common head and a fluid motor for applying pressure to and removing pressure from the said head.

9. A wrapping machine including a rotary shuttle, a race-way within which the shuttle is mounted, means for moving an annular body to be wrapped along within the shuttle, and means for adjusting the race-way and hence the shuttle both radially in the plane and transversely to the plane of the body to be wrapped.

10. A wrapping machine including an annular shuttle, a raceway in which the shuttle is mounted to rotate, driven rollers arranged in a horizontal annular path for supporting and moving an annular body along within the shuttle, and means for exerting pressure in a vertical direction on the annular body as it rests on the driven rollers.

11. A wrapping machine including an annular shuttle, a raceway in which the shuttle is mounted to rotate, driven rollers arranged in a horizontal annular path for supporting and moving an annular body along within the shuttle, pressure rollers arranged opposite the said driven rollers, and means for exerting pressure in a vertical direction upon the said pressure rollers.

12. A wrapping machine including an annular shuttle, a raceway in which the shuttle is mounted to rotate, driven rollers arranged in a horizontal annular path for supporting and moving an annular body along within the shuttle, pressure rollers arranged opposite the said driven rollers, means for exerting pressure in a vertical direction on said pressure rollers, and adjustable guide rollers mounted in position to bear against the periphery of said annular body at intervals.

13. A wrapping machine including a set of rollers arranged in a horizontal annular path for supporting an annular body to be wrapped, a second set of rollers arranged in a horizontal annular path above the first set, the rollers of one set being driven for moving the body in an annular course and the rollers of the other set being adapted to prevent the body from vertical dislodgment, a third set of radially adjustable rollers adapted to prevent the body from horizontal dislodgment, and means for applying a wrapper to the body as it moves along its annular course.

14. A wrapping machine including a rotary shuttle, a raceway in which it is mounted to rotate, driven cone-shaped rollers arranged in a horizontal annular path for supporting and moving an annular body along within the shuttle, cone shaped pressure rollers arranged above said driven rollers, the adjacent faces of said upper and lower rollers being substantially parallel, and means for exerting pressure upon the pressure rollers.

15. A wrapping machine including a rotary shuttle, a race-way in which it is mounted to rotate, radially disposed driven cone shaped rollers arranged in a horizontal annular path for supporting and moving an annular body along within the shuttle, radially disposed pressure rollers arranged above said driven rollers, and means for exerting pressure upon the pressure rollers.

16. A wrapping machine including a rotary shuttle, a race-way in which it is mounted to rotate, radially disposed driven cone shaped rollers arranged in a horizontal annular path for supporting and moving an annular body along within the shuttle, radially disposed pressure rollers arranged above said driven rollers, the adjacent faces of said upper and lower rollers being substantially parallel, and means for exerting pressure upon the pressure rollers.

17. A wrapping machine including a rotary shuttle, a race-way in which it is mounted to rotate, radially disposed driven cone shaped rollers arranged in a horizontal annular path for supporting and moving an annular body along within the shuttle, cone shaped pressure rollers arranged above said driven rollers and carried by arms extending from a common head, the smaller ends of said upper and lower cone shaped rollers extending inwardly and the adjacent faces of said upper and lower rollers being substantially parallel, and means for exerting pressure in a vertical direction on the said common head.

18. A wrapping machine including a table, rollers mounted in said table in a horizontal annular path for supporting an annular body to be wrapped, another set of rollers supported above the first set and arranged to engage the upper side of the body to be wrapped, and guide pins mounted in said table and engaging the said rollers of the upper set to prevent them from lateral vibration or displacement.

19. A wrapping machine including a table, rollers mounted in said table in a horizontal annular path for supporting an annular body to be wrapped, another set of rollers supported above the first set and arranged to engage the upper side of the body to be wrapped, and guide pins mounted in said table and engaging the said rollers of the upper set to prevent them from lateral vibration or displacement, one of said pins being removable for the ready insertion and removal of the body to be wrapped.

20. A wrapping machine including a table, rollers mounted in said table in a horizontal annular path for supporting an annular body to be wrapped, a frame mounted on said table, a common head supported from said frame, arms radiating from the said common head, rollers carried by said arms above the first mentioned rollers and arranged to engage the upper side of the body to be wrapped, and mechanism mounted in said frame for exerting pressure in a vertical direction on the said common head.

In testimony, that we claim the foregoing as our invention, we have signed our names in presence of two witnesses, this eighth day of September, 1909.

ALBERT DE LASKI.
PETER D. THROPP.

Witnesses:
  JAMES BUCHANAN,
  MARY L. I. NEAL.